(12) United States Patent
Weingaertner (10) Patent No.: US 11,029,456 B2
(45) Date of Patent: Jun. 8, 2021

(54) RETROREFLECTOR HAVING A CURVED SURFACE

(71) Applicant: IMOS Gubela GmbH, Renchen (DE)

(72) Inventor: Simon Weingaertner, Neuried (DE)

(73) Assignee: IMOS Gubela GmbH, Renchen (DE)

( * ) Notice: Subject to any disclaimer, the term of this patent is extended or adjusted under 35 U.S.C. 154(b) by 397 days.

(21) Appl. No.: 16/251,362

(22) Filed: Jan. 18, 2019

(65) Prior Publication Data

US 2019/0227206 A1    Jul. 25, 2019

(30) Foreign Application Priority Data

Jan. 22, 2018   (DE) ..................... 10 2018 101 289.6

(51) Int. Cl.
*G02B 5/122* (2006.01)
*G02B 5/124* (2006.01)
*G02B 5/126* (2006.01)

(52) U.S. Cl.
CPC ............. *G02B 5/122* (2013.01); *G02B 5/124* (2013.01); *G02B 5/126* (2013.01)

(58) Field of Classification Search
None
See application file for complete search history.

(56) References Cited

U.S. PATENT DOCUMENTS

| | | |
|---|---|---|
| 3,744,117 A | 7/1973 | Heenan et al. |
| 3,817,596 A | 6/1974 | Tanaka |
| 3,873,184 A | 3/1975 | Heenan |
| 5,189,553 A | 2/1993 | Smith |
| 5,706,132 A | 1/1998 | Nestegard et al. |
| 5,763,049 A * | 6/1998 | Frey ...................... G02B 5/124 428/172 |

(Continued)

FOREIGN PATENT DOCUMENTS

| | | |
|---|---|---|
| DE | 44 10 994 C2 | 1/1996 |
| DE | 202 07 645 U1 | 10/2002 |

(Continued)

OTHER PUBLICATIONS

Partial European Search Report in EP 18 21 0406, dated May 15, 2019, with English translation of relevant parts.

(Continued)

*Primary Examiner* — William R Alexander
*Assistant Examiner* — Tamara Y. Washington
(74) *Attorney, Agent, or Firm* — Collard & Roe, P.C.

(57) ABSTRACT

A retroreflector has an arrangement of triples, each having three side surfaces that stand essentially perpendicular on one another. The triples are disposed on a curved or domed surface. The geometry of the triple array is adapted to the curved surface, to even out the thresholds, and extend the side surfaces of a triple. The extensions of the side surfaces project into adjacent triples. Due to the extension projecting into adjacent triples, joints are formed there, which even out the uneven area. The joints can assume the form of a protrusion filled with material or a notch in which material is missing. A forming die produces the retroreflector and a method produces the forming die. The retroreflectors have geometries having full cube surfaces, in other words Full Cubes, for curved or domed surfaces or free-form surfaces.

18 Claims, 7 Drawing Sheets

(56) References Cited

U.S. PATENT DOCUMENTS

| | | |
|---|---|---|
| 7,135,671 B2 | 11/2006 | Gubela, Sr. |
| 7,261,424 B2 * | 8/2007 | Smith .............. B29D 11/00605 359/529 |
| 8,247,263 B2 | 8/2012 | Braune et al. |
| 10,101,591 B2 | 10/2018 | Lauret |
| 2006/0007542 A1 | 1/2006 | Smith |
| 2006/0158736 A1 | 7/2006 | Bacon, Jr. |
| 2010/0277801 A1 | 11/2010 | Nakajima |
| 2010/0284080 A1 | 11/2010 | Mullen |
| 2011/0227238 A1 | 9/2011 | Mimura et al. |
| 2017/0068022 A1 | 3/2017 | Buoni |
| 2017/0160631 A1 * | 6/2017 | Wang ................... G03B 21/606 |
| 2017/0321039 A1 | 11/2017 | Kuhn et al. |

FOREIGN PATENT DOCUMENTS

| | | |
|---|---|---|
| DE | 696 22 754 T2 | 4/2003 |
| DE | 102 16 579 A1 | 10/2003 |
| DE | 10 2005 009 066 A1 | 9/2006 |
| DE | 10 2012 022 418 A1 | 5/2014 |
| DE | 20 2014 102 938 U1 | 8/2014 |
| DE | 10 2014 212 918 A1 | 1/2016 |
| DE | 10 2014 223 785 A1 | 5/2016 |
| EP | 1 756 632 B1 | 7/2015 |
| EP | 2 927 580 A1 | 10/2015 |
| GB | 918 015 A | 2/1963 |
| GB | 1 426 230 A | 2/1976 |
| WO | 2015/145026 A1 | 10/2015 |
| WO | 2017/182171 A1 | 10/2017 |

OTHER PUBLICATIONS

German Search Report in DE 10 2018 101 289.6, dated Sep. 21, 2018, with English translation of relevant parts.

German Search Report in DE 10 2018 101 291.8, dated Sep. 21, 2018, with English translation of relevant parts.

German Search Report in DE 10 2018 101 292.6, dated Sep. 21, 2018, with English translation of relevant parts.

DIN 67 520, Retro-reflecting materials for traffic safety: photometric evaluation, measurement and characterization of retroreflectors and retro-reflecting sheetings, Sep. 1982, 4 pages.

DIN EN 12899-3, Fixed vertical road traffic signs—Part 3: Delineator posts and retroreflectors, Feb. 2008, 28 pages.

P. R. Yoder, Jr., "Study of Light Deviation Errors in Triple Mirrors and Tetrahedral Prisms", Journal of the Optical Society of America, vol. 48, No. 7, Jul. 1958, pp. 496-499.

Complete European Search Report dated Aug. 28, 2019 in European Application No. 18210406.7 with English translation of relevant parts.

* cited by examiner

RETROREFLECTOR HAVING A CURVED SURFACE

CROSS REFERENCE TO RELATED APPLICATIONS

Applicant claims priority under 35 U.S.C. § 119 of German Application No. 10 2018 101 289.6 filed Jan. 22, 2018, the disclosure of which is incorporated by reference.

BACKGROUND OF THE INVENTION

1. Field of the Invention

The invention relates to a retroreflector on a curved or domed surface or a free-form surface, and a forming die for production of the retroreflector.

The term retroreflector should be understood to mean optical elements that guide incident light back to the light source, in a specific angle range, independent of the precise incidence angle. Certain deviations of the reflected beam from the incidence direction are possible in this regard, and in part are actually desirable. For example, deviations are desirable if light source and intended recipient of the reflected radiation are not in precise alignment, viewed from the reflector.

2. Description of the Related Art

Different types of retroreflectors are known. A known type of reflective elements or, stated more precisely, of retroreflective elements are represented, for example, by foils having embedded microbeads in front of a reflective layer.

In general, reflective elements that comprise one or more Cube Corner elements for retroreflection have a clearly higher degree of retroreflection and thereby degree of effectiveness than such microbead-based foils. Such a Cube Corner ("cube corner") consists, in this regard, of three surfaces that essentially stand perpendicular to one another, in each instance, and is therefore also called a triple. A corresponding retroreflector generally comprises a plurality of such triples, in this regard, which are therefore regularly arranged in an array. The regular arrangement for formation of a Full Cube is referred to as a triple array.

If the three triple surfaces do not stand precisely perpendicular to one another, then the direction of at least part of the reflected light will deviate by a certain amount from the direction of the incident light, but this deviation can be advantageous for certain applications, such as wide-angle structures in road traffic or for light deflection.

For use in reflector foils as described in U.S. Pat. No. 3,810,804 A (Applicant: Rowland Dev. Corp.), for example, the triples frequently consist of tetrahedral structures, i.e. of half cubes, that are cut off along a diagonal line. Such pyramid structures have the disadvantage that they have a maximal degree of effectiveness of approximately 66% due to dead surfaces, i.e. whose surfaces the reflected beams of which cannot be reflected further.

Arrangements in which the three surfaces that are essentially always perpendicular to one another, in each instance, are essentially square and of the same size are also very common. They then form a corner (in other words three surfaces that come together at a point) of a cube. Such a special triple will be referred to as a Full Cube hereinafter. The spatial diagonal line of this imaginary cube forms what is called the triple axis. If the light entry surface on which the triple is illuminated, in other words the aperture surface, is perpendicular to the triple axis, then in the case of a Full Cube, in the case of light incidence parallel to the triple axis, ideally 100% of the incident light is reflected back in the direction from which it came, and this reflection percentage results in a high degree of effectiveness of reflectors provided with these triples.

If, until now, a retroreflector based on triple mirrors, in particular based on Full Cubes, was to be applied to a curved surface, the rigid structure of the triple mirrors was a difficulty. In order to be able to affix triple mirrors at all, significant efforts had to be made. DE 202 07 645 U1 (Applicant: IMOS Gubela GmbH) proposes a two-part hook-and-loop closure band, for example, as a force equalization layer between a triple reflector and a cable. Up to the present, curvatures with two curvature directions, for example spherical, toroidal, ellipsoidal, parabolic or hyperbolic curvatures or free-form surfaces have not been possible with usual retroreflectors based on triple mirrors, and also not with reflector foils with the full cube geometry.

A desire also exists to design retroreflectors that have geometries with full cube surfaces, in other words Full Cubes, which thereby have a degree of reflection effectiveness close to 1, for curved or domed surfaces, as well.

SUMMARY OF THE INVENTION

This task is accomplished by a retroreflector according to one aspect of the invention, which can be produced, for example, using a forming die according to another aspect of the invention, by means of injection molding.

A retroreflector according to the invention has an arrangement of triples having three side surfaces that stand essentially perpendicular to one another, in each instance. The triples are disposed on a curved or domed surface.

Side surfaces referred to as standing essentially perpendicular to one another are side surfaces that enclose an angle, relative to one another, between 85° and 95°, preferably between 89° and 91°, particularly preferably between 89° 58' and 90° 2'. The goal is that the side surfaces of a triple form an angle of 90° degrees in spite of the curvature or dome of the surface. Deviations from the right angle should occur only if they were planned in targeted manner, for example for a wide-angle structure. It is understood that production-related tolerances can also lead to a deviation from a precise right angle.

The curvature of the surface leads to the result that a single cube element along a vector, for example along a vector in the direction of the cube diagonal, is offset from its location that it would have in the case of a level arrangement in the array. Due to this offset, uneven areas or thresholds occur at the transition to adjacent triples. According to the invention, it is proposed to undertake an adaptation of the geometry of the triple array to the curved surface to even out the thresholds, in that the side surfaces of a triple are extended.

Side surfaces of a triple are boundary surfaces between a volume filled with solid material and a volume in which solid material is absent, in other words cut out. Extending a side surface can therefore have two alternative effects.

First of all, additional material can remain behind the extension. Second, material that would be present in a flat retroreflective arrangement of triples can be absent. The extensions of the side surfaces project into adjacent triples, according to the invention.

Due to the projection of the extension into adjacent triples, joints are formed there, which even out the uneven area. The joints can assume the form of a protrusion filled with material or of a notch in which material is absent.

Using this method of procedure, conformality of the triples is guaranteed even in the case of curved surfaces. The most efficient ways of producing a retroreflector according to the invention are a plastic injection-molding process, stamping of foils, and 3D printing.

Suitable materials are plastics that are transparent under visible light, such as polymethyl methacrylate (PMMA) or polycarbonate (PC). A forming die is needed for forming it in plastic.

A preferred possibility for the production of a suitable forming die is offered by the micro-cutting method. A diamond needle on a multi-axial machine, for example, can serve as the cutting tool. During micro-cutting, each triple is individually worked out of solid material. Working takes place from different directions. In other words, each individual triple is carved out of solid material, just like material is chiseled out of a soft body using a chisel.

Due to the individual working of each triple, however, the micro-cutting method is very time-consuming, so that it is efficient to use the method for the production of a master, in other words a forming die. The original form of the forming die and therefore also the forming die itself is preferably composed of one of the metals aluminum, copper, gold, lead or a nickel alloy with copper and zinc (German silver). Nickel phosphorus is particularly suitable for being worked with diamond cutters, and for the production of optical mold inserts.

A forming die according to the invention has a regular arrangement of triples, with three side surfaces that stand essentially perpendicular on one another, in each instance. According to the invention, during micro-cutting curvatures of the surface are evened out in such a manner that the side surfaces of a triple are cut out of the original form, without taking material into consideration, during working, that stands in the way of working due to the curvature of the surface, i.e. an offset between two triples that results from it. The offset between two adjacent triples that results from the curvature can lead to an overlap of the triples. This overlap leads to the result that during working of the side surface of a first triple, material of an adjacent second triple, in particular material in an overlap region of the first with the second triple, is also removed. As a result, according to the invention, the side surface of the first triple is extended into the second triple.

A curvature or dome of the surface is therefore evened out in the forming die so that individual triples have side surfaces having at least one extension. The extension extends along a side surface of an adjacent triple, reducing the size of this side surface, proceeding from a rectangular and preferably square basic shape, and forms a joint in the form of a notch in the side surface of the adjacent triple.

From the master, further forming dies can be obtained using galvanic molding. The further forming dies are a negative of the master in this case, and the retroreflectors assume the original form of the master once again. A convex curvature of the surface of the original master remains convex, and a concave curvature of the original master remains concave. The geometry for evening out the curvature also remains in existence. Individual triples that have side surfaces with extensions or notches in the master have these in the retroreflector, as well. The extensions that extend along the side surfaces of adjacent triples in the master and form notches in the side surfaces of the adjacent triples also extend along the side surfaces of adjacent triples in the retroreflector and form notches there.

The master can also be used directly so as to produce retroreflectors using the injection-molding method or stamped areas in a foil. In this regard, the retroreflectors are a negative of the forming die according to the invention. Negatives are understood to be molds in which volume regions that are filled with solid material in the positive mold, like the master, are cavities, and volume regions that are cavities in the positive mold are filled with solid material. A convex curvature of the surface of the original master becomes concave, and a concave curvature of the original master becomes convex. The extensions of the side surfaces remain in existence. In the negative, however, the notches are filled with material. Notches in the master form protrusions in the negative mold of the retroreflector. The protrusions are step-shaped. In other words: the protrusions project from the side surfaces like a balcony. A curvature or dome of the surface is therefore evened out in such a manner that individual triples have side surfaces having at least one extension, wherein the extension extends along a side surface of an adjacent triple, and forms a protrusion in a side surface of an adjacent triple.

The further developments and definitions described below apply both to the forming and to retroreflectors according to the invention:

According to an advantageous further development of the invention, the extension of a side surface lies in a plane spanned by the related side surface, in each instance. For clarification purposes, reference is made to the Miller indices usual in crystallography. The Miller indices are particularly well suited for representation of the cube structures shown here. The Miller indices are formed as follows: The intersection points of the cube plane are determined using the three coordinate axes, common factors are shortened, the reciprocal values are formed and multiplied by the smallest common multiple of the nominators, so that three whole numbers, which cannot be divided, are obtained. The first side surface of the first triple lies in the (100) plane, for example, the second side surface of the first triple lies in the (010) plane, and the third side surface lies in the (001) plane. If an extension is formed on the first side surface, this extension advantageously also lies in the (100) plane.

The extension and the side surface therefore enclose an angle of 180°. There is no bend between the extension and the related side surface. The extension furthermore does not have any point that projects out of the (100) plane.

In particular, the (100) extension of the first (100) side surface is not expanded in the x-direction, i.e. does not bend into the x-direction. This arrangement has the advantage that light that impacts such an extension in a retroreflector produced from the forming die according to the invention has two further reflection surfaces in its beam path, with a certain probability.

Because the extension lies in the same plane as the side surface, the possible further reflection surfaces stand essentially perpendicular on the extension. With this configuration, the result can be achieved that at least part of the surface of the extension is available for retroreflection. The extension is therefore not a dead surface.

Although certain losses due to the curvature cannot be avoided, the retroreflector has a degree of effectiveness of retroreflection of more than 95%, up to as much as 99%. In other words, between 95% and 99% of the illumination intensity of the incident radiation will be retroreflected again, in a direction opposite to the incident beam.

According to a further aspect of the invention, an edge length of the side surface is greater by at least a factor of 5, preferably by a factor of 10 than a width of the extension. A definition of the edge length is given below. The width of the extension is understood to be the dimension of a line at which the extension is joined together with the side surface assigned to it. The edge of the side surface, in the extension of which the width of the extension is measured, can also be selected as the reference edge with which the width of the extension is compared.

Preferably, a length of the extension amounts to between 50% and 100% of the edge length of the adjacent side surface along which the extension extends. The length of the extension can be understood to be the dimension of a line that stands perpendicular on the line for measuring the width and extends from the point at which the extension is connected with the side surface assigned to it until the end of the extension. In other words, the extension follows the adjacent side surface on almost its entire length. This arrangement also contributes to minimizing losses due to dead surfaces. Furthermore, undercuts, which are a problem for injection molding, are avoided if the extension follows the side surface of the adjacent triple on its entire length.

It is advantageous if a width across flats of the triples is selected to be as small as possible. The width across flats is the regular distance between two apices, defined below. Widths across flats of up to 200 µm can be achieved by means of micro-cutting. In particular, the width across flats should be small in relation to a curvature radius of the surface. Preferably, the curvature radius of the surface is greater by at least a factor of 50, particularly preferably by at least a factor of 150, and at most by a factor of 10,000 than the width across flats of the triples. In the case of surfaces having a non-spherical curvature, the minimum, i.e. the smallest of all local curvature radii is decisive. The greater the ratio between curvature radius and width across flats, the less the relative offset of a triple with regard to its regular position in a flat array.

According to a further aspect of the invention, the extension is disposed in a corner region of the side surface. From this arrangement, it follows that the side surface has a rectangular basic shape, to which the extension is connected with a panhandle-type shape. In other words, the side surface, together with the extension assigned to it, has a shape similar to the U.S. State of Oklahoma on a map.

As described above, the side surfaces of a triple can have planes assigned to them, for example using the Miller indices. An intersection point of these three planes can be defined as the apex. For example, the (100) plane, the (010) plane, and the (001) plane intersect at the point (1, 1, 1) of the spatial domain. The point (1, 1, 1) forms the apex of the triple, the side surfaces of which lie in the (100) (010) and (001) planes. In other words, the side surfaces, i.e. an imaginary extension of the side surfaces, intersect in the apex, passing over a notch. An axis of symmetry of the triple can be laid through the apex. The axis of symmetry has the same angle relative to all the planes of the side surfaces.

Using the apex just defined, it is now possible to also indicate all the edge lengths of a triple. If only two planes assigned to the side surfaces of the triple intersect, an intersection line occurs. Three such intersection lines can be assigned to each triple. Let the distance of the apex from an intersection point of the intersection line with a plane that can be assigned to the side surface of an adjacent triple be defined as the edge length of a triple. In this regard, the intersection line intersects the plane of the side surface of the adjacent triple approximately perpendicularly. Because each triple has three intersection lines, each triple can also have three edge lengths assigned to it.

To state it differently, the edge length is the length that the edge of a cube element would have without taking the extensions and joints into consideration.

If only very small angles of the reflected beam relative to the incident beam are supposed to be observed, it is advantageous if all three edge lengths of a triple have the same size. In the case of wide-angle applications (see, for example, DE 102 16 579 A1, applicant: Hans-Erich Gubela Senior), however, different edge lengths can also be desirable. In the case of these wide-angle applications with different edge lengths, the axis of symmetry deviates from the spatial diagonal of the triple.

Depending on whether a wide-angle arrangement or only a narrow angle range of the reflected beam is desirable, a different orientation of the axis of symmetry of the triples can be selected. For a narrow angle range, it is advantageous if the axes of symmetry of all the triples run parallel to one another, if at all possible. For a wide-angle arrangement, it is advantageous if the axes of symmetry of the triples follow the curvature or the dome of the surface. This arrangement can be achieved, for example, if the axis of symmetry is oriented along a locally defined normal line vector of the surface. Of course, other tilts of the triples or a combination of the two variants, in certain regions, are also conceivable. In other words, in a first region of the forming die or of the retroreflector, for example with a smaller curvature radius, in terms of amount, the axes of symmetry follow the curved surfaces, and in a second region of the forming die or of the retroreflector, for example with a greater curvature radius, in terms of amount, the axes of symmetry are parallel to one another.

Other possibilities for implementing the invention are also conceivable. For example, it can be imagined to print the forming die or the retroreflector itself, in the geometry according to the invention, using a 3D printer. Likewise, the invention is also not restricted only to spherically curved surfaces, but rather can be applied to curved surfaces having different shapes. Toroidal, ellipsoidal, parabolic or hyperbolic curvatures or curvatures of free-form surfaces, for example rotation bodies formed from splines or NURBS are conceivable.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
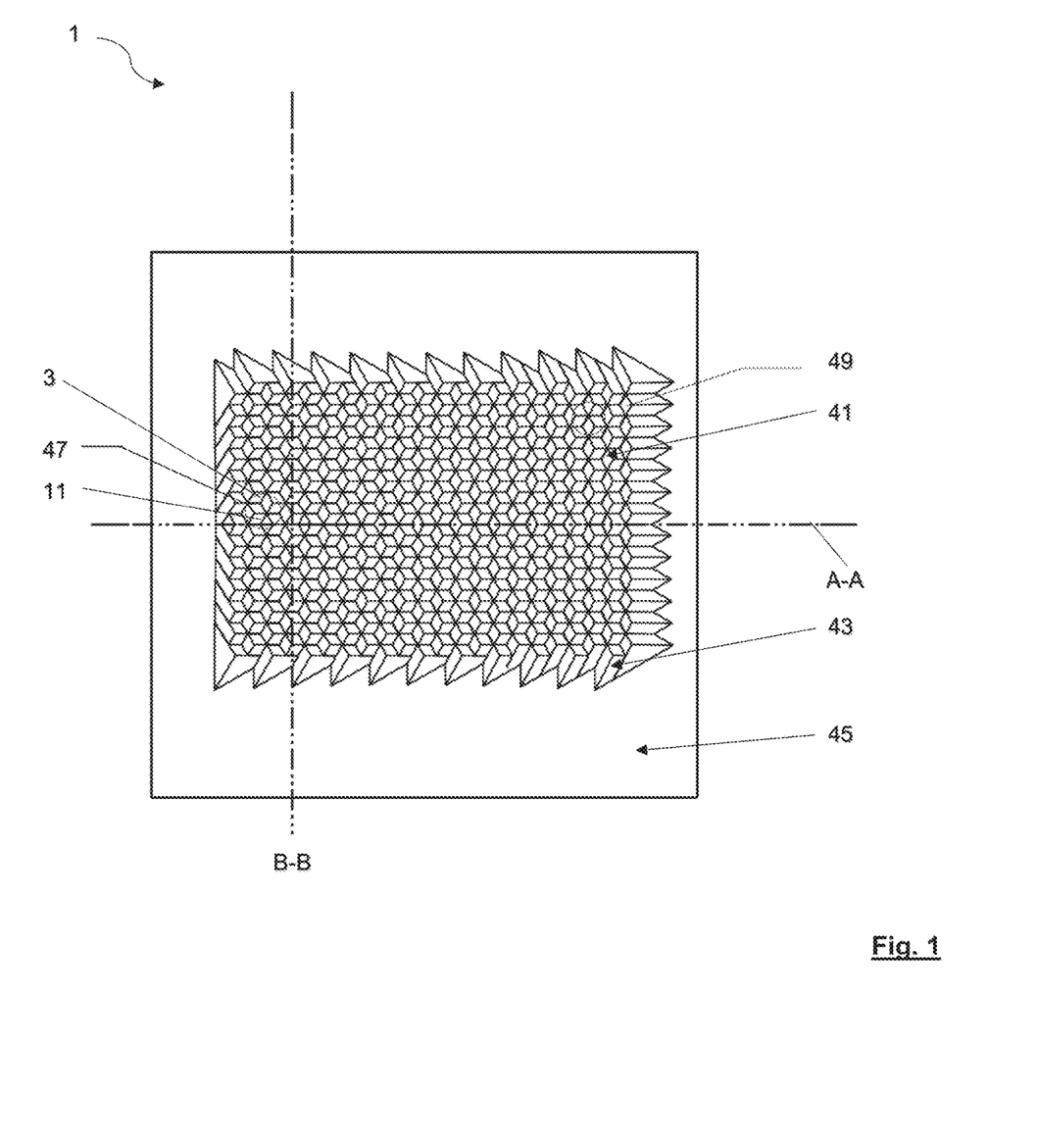
FIG. 1 shows a profile of a forming die according to the invention.

FIG. 1 shows a profile of a forming die 1 according to the invention, for forming a triple array as a Full Cube retroreflector. In a central region 41, regularly disposed triples 3, 11 are shown. The triples are configured in cube shape. All the edge lengths a (shown in FIG. 2) of the triples 3, 11 have the same size. The triples are disposed on a curved surface. The curvature radius of the surface is selected to be so great that the effects of the curvature are not directly visible in the representation of FIG. 1. As will be shown later, the curvature nevertheless has an effect on the angle relationships of the individual triples 3, 11. A gate area 43 is disposed around the central region of the forming die 1. In the gate area 43, the traces that a cutting tool left during micro-cutting can be seen. The direction of cutting is visible. It can also be seen that each side surface 5, 7, 9, 13, 15, 17 is worked from a different direction, out of the solid material. The basic body 45 of the forming die 1 is situated around the gate area 43.

Figure 2:
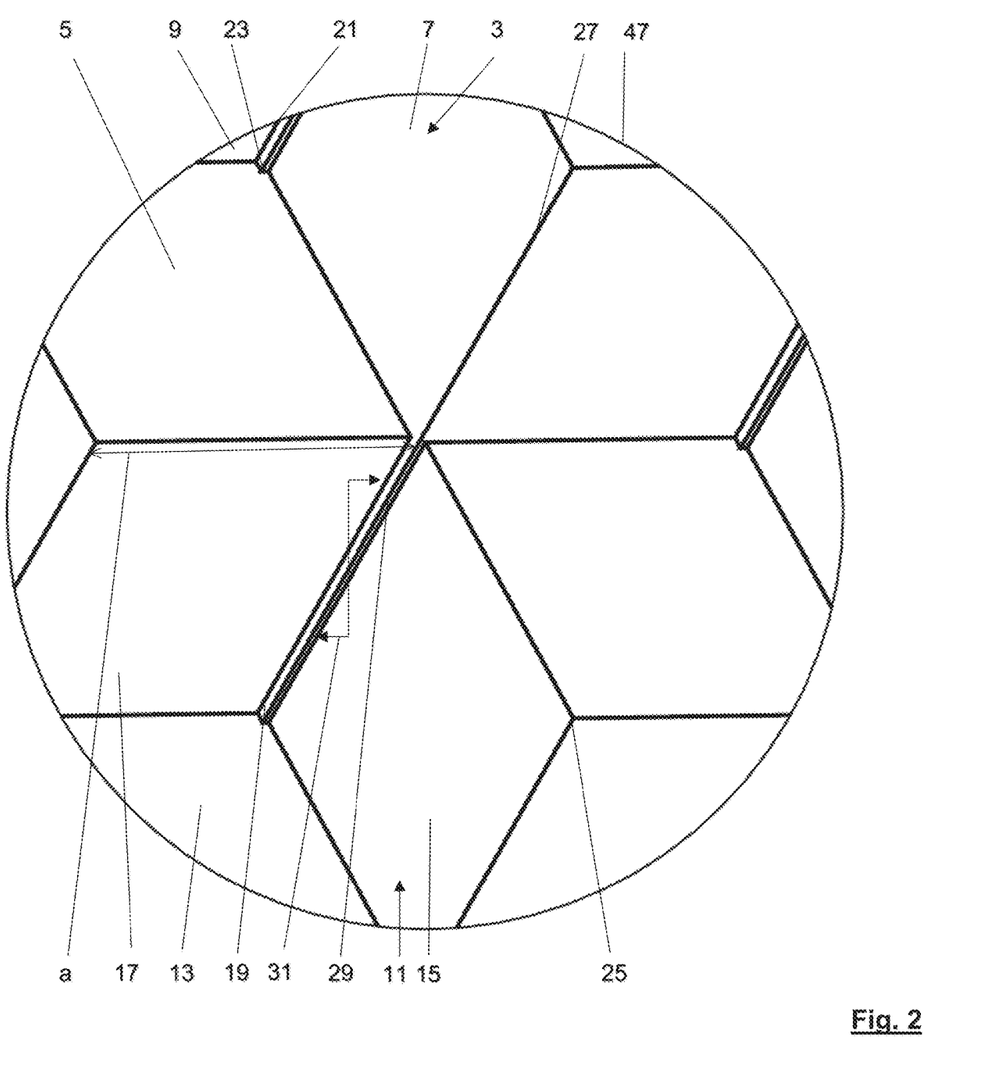
FIG. 2 is a detail from FIG. 1 in great magnification.

FIG. 2 shows a magnified detail 47 (first detail) from FIG. 1, with a first triple 3 and an adjacent second triple 11. The first, second, and third side surfaces 5, 7, 9 are assigned to the first triple 3. The side surfaces 5, 7, 9 stand perpendicular on one another. The side surfaces 7, 9 have notches 21. The notches 21 run along an edge region 31 of the side surfaces 7, 9 and extend over their full edge length a. The side surfaces 13, 15, 17 are assigned to the second triple 11 (first, second, and third side surfaces of the second triple). The side surface 7 of the first triple 3 forms an extension 19. The extension 19 lies in the same plane as the side surface 7. The extension 19 is simultaneously a notch of the side surface 17 of the second triple 11. In order to make the three-dimensional structure clear, apex 23 and low point 25 of the structure are indicated. The apex 23 is connected with the low point 25 by way of an inner edge 27 and an outer edge 29. An inner edge 27 is an edge that delimits two adjacent triples 3, 11; an outer edge 29 delimits two side surfaces 5, 7, 9 within a triple 3.

Figure 3:
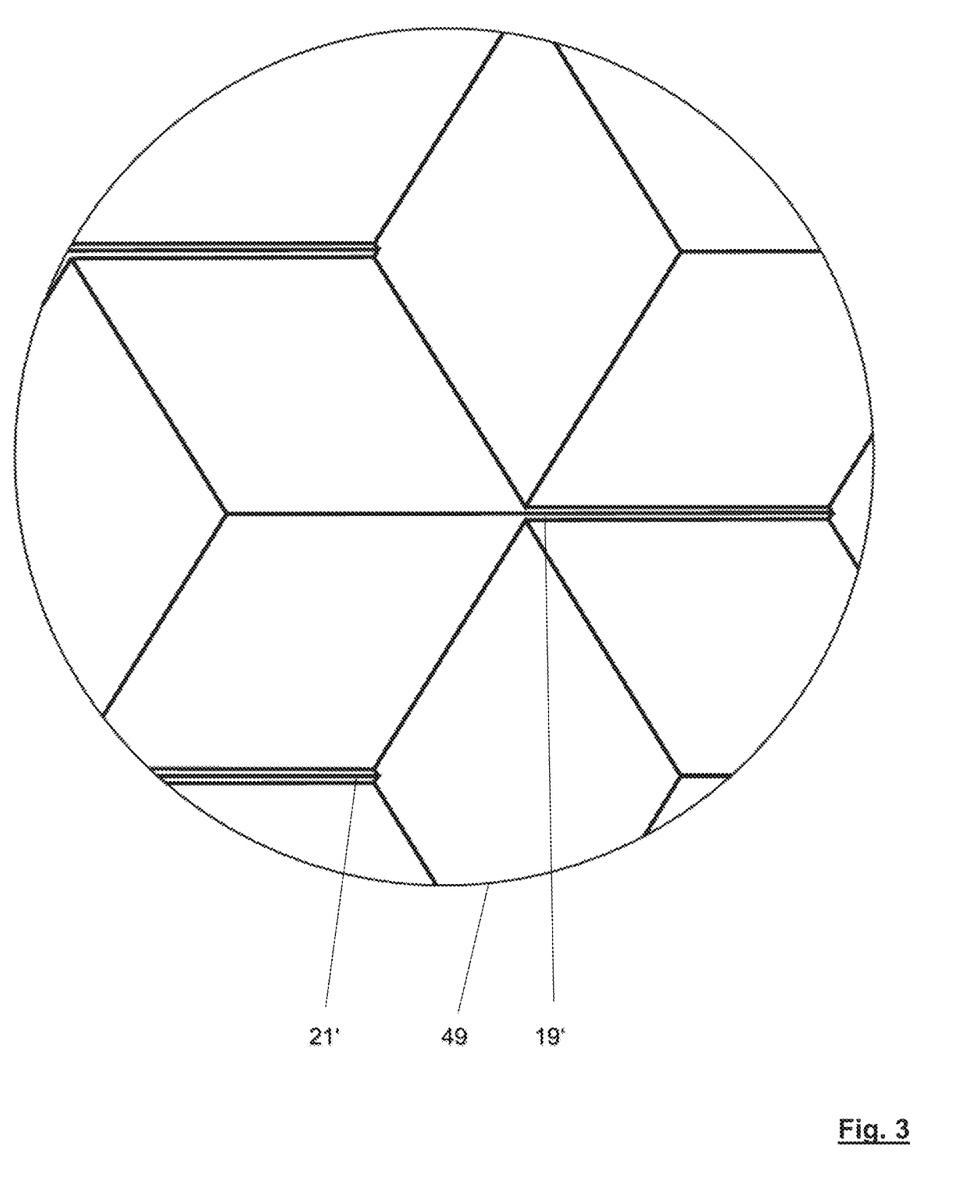
FIG. 3 is a further detail from FIG. 1.

FIG. 3 shows another detail 49 (second detail) from FIG. 1. A comparison of FIG. 2 and FIG. 3 makes the effects of the curvature of the surface visible. The extensions 19' and notches 21' face in a direction perpendicular to the extensions and notches from FIG. 2.

Figure 4:
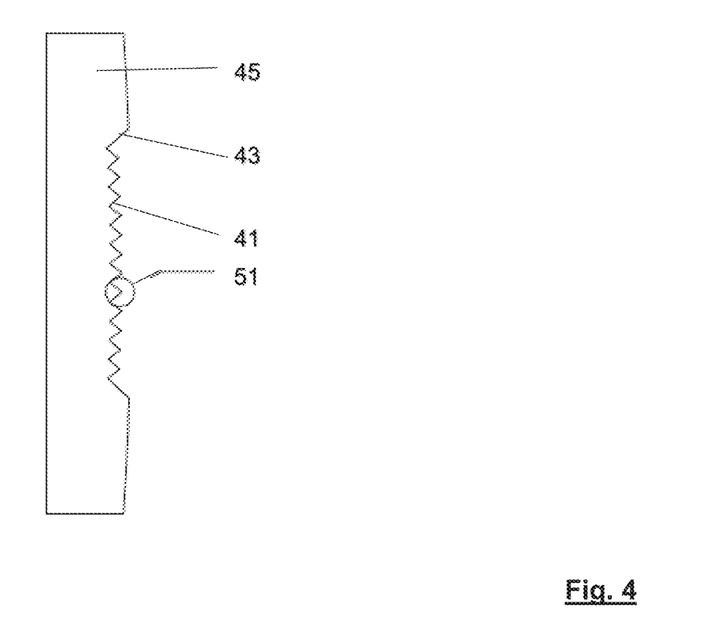
FIG. 4 is a section along an axis A-A through FIG. 1.
Figure 5:
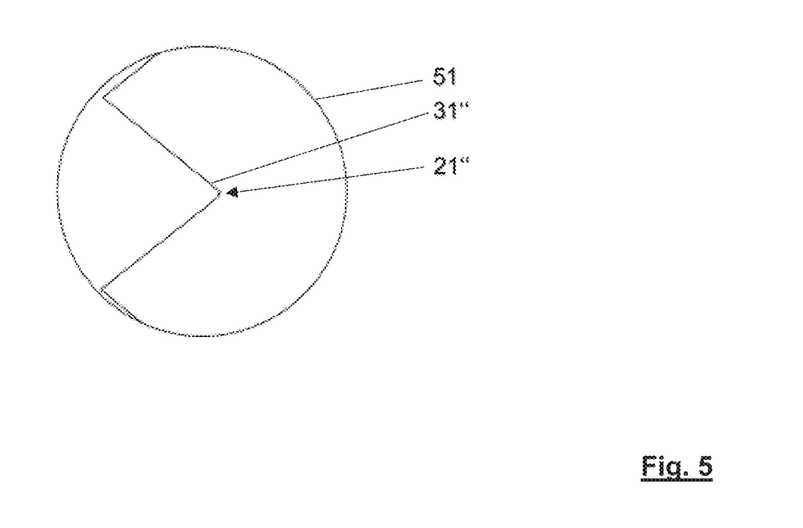
FIG. 5 is a magnified detail from FIG. 4.

FIGS. 4 and 5 show the notches once again, from a different perspective.

FIG. 4 shows a section through the forming die 1 along the axis A-A (see FIG. 1). The central region 41, the gate area 43, and the basic body 45 are clearly evident.

FIG. 5 shows a magnification region 51 (in section A-A) from FIG. 4. A notch 21" in the edge region 31" of two side surfaces, in other words a corner, can be seen.

Figure 6:
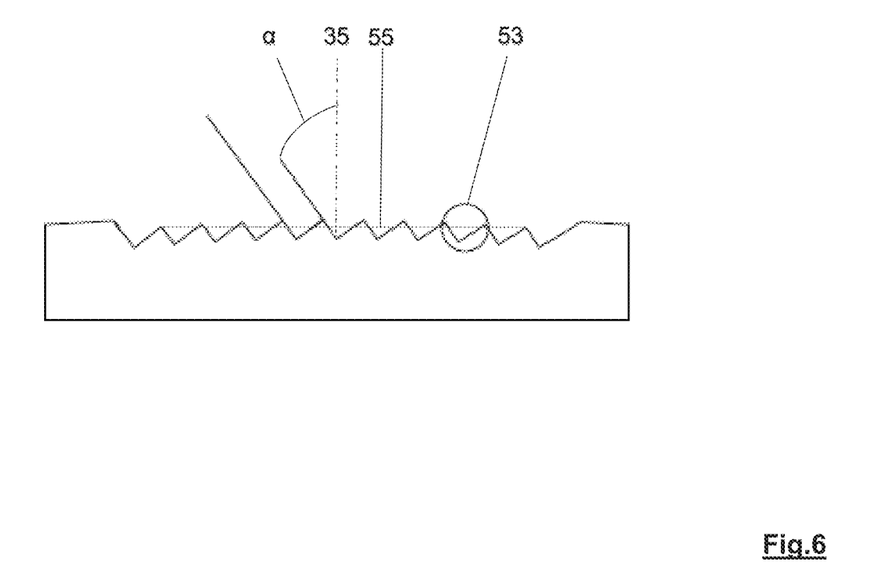
FIG. 6 is a section along the axis B-B through FIG. 1.

In FIG. 6, a section along the axis B-B from FIG. 1 is shown. The curvature of the surface can be seen in that the apices of the center triples project beyond a connection line 55 of the apices of the outer triples, which line is drawn as a dotted line. A normal line vector 35 of the curved surface is shown. The side surfaces enclose an angle α of 35.26° relative to the normal line vector. This angle corresponds to the small angle that the spatial diagonal in the cube encloses relative to the side surfaces. The region 53 (in section B-B) is shown magnified in FIG. 7.

Figure 7:
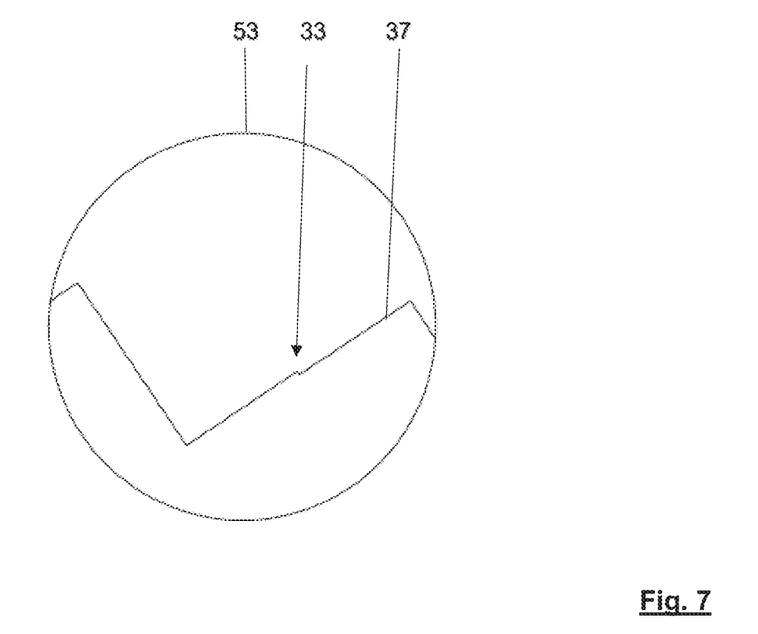
FIG. 7 is a magnified detail from FIG. 6.

In FIG. 7, a further artifact of the curvature becomes visible. In the case of flat surfaces, all the edges run along a line. Due to the curvature, the edge 37 has a jump 33. It is true that the edge 37 continues to run parallel to the original progression after the jump 33, but it is offset relative to the jump.

The jump 33 is situated at a transition at which the edge 37 changes over from being an inner edge 27 (see FIG. 2) to being an outer edge 29 (see FIG. 2). The jump 33 evens out the offset caused by the curvature. At the location of the jump 33, an inner edge 27 intersects a side surface 7 having an extension 19, 19'. An outer edge intersects a side surface 15 having a notch 21, 21', 21" (see FIGS. 2, 3 and 5).

Figure 8:
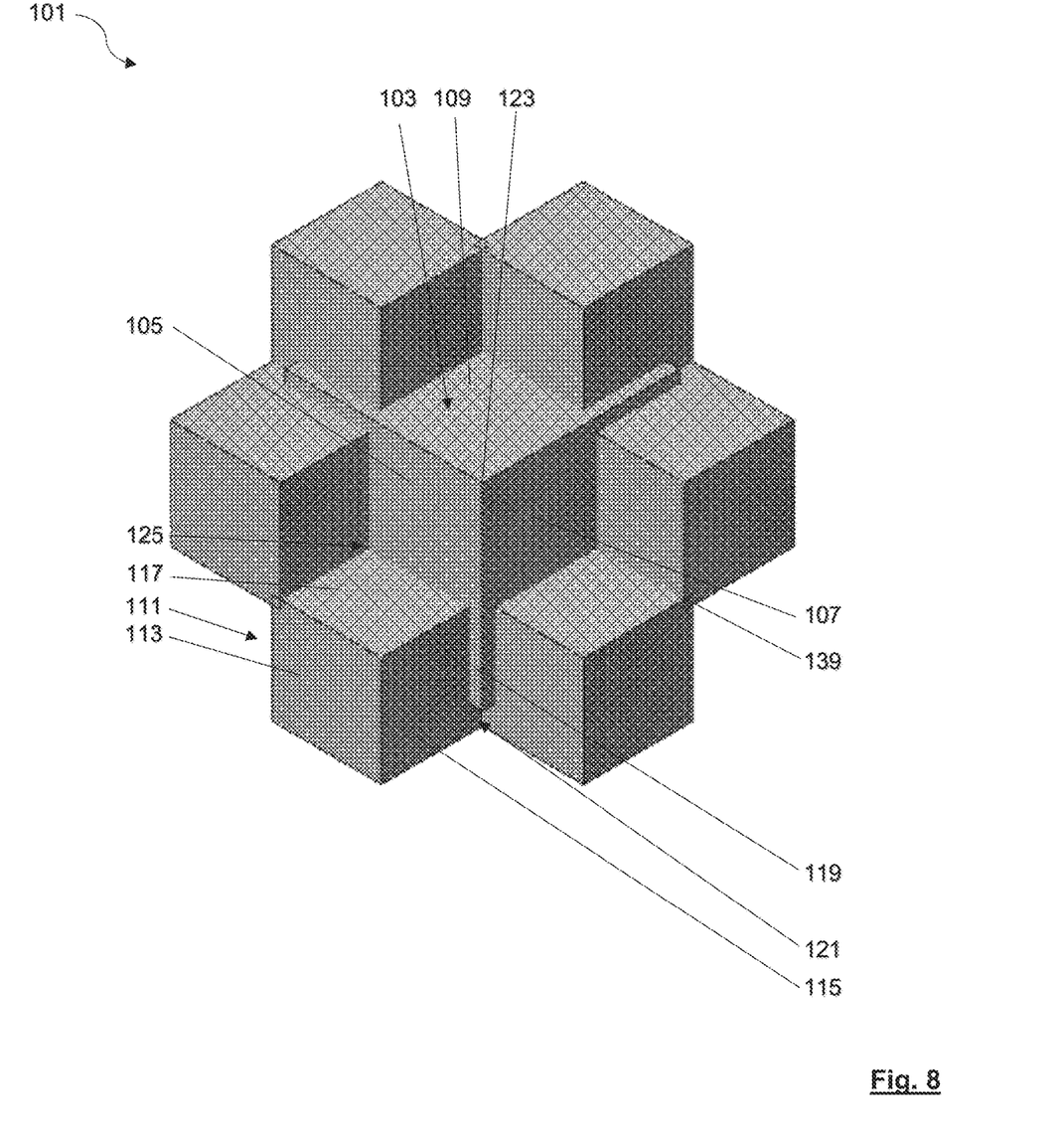
FIG. 8 is a detail of a retroreflector according to the invention.

FIG. 8 shows an exaggeratedly schematic representation of a retroreflector 101 according to the invention. The apex 123 and low point 125 of the structure are indicated. The retroreflector 101 can be understood as a negative mold of a forming die 1 described above and shown in FIGS. 1 to 7. The first triple 103 is offset out of the plane of the drawing relative to the second triple 111 and the remaining triples, without a reference symbol, i.e. the surface in which all the apices, for example the apex 123 lie, forms a convex dome. The side surface 105 of the retroreflectors corresponds to the side surface 5 of a forming die from the preceding figures; the side surface 107 corresponds to the side surface 7 of a forming die, etc. The first, second, and third side surfaces 105, 107, 109 of the first triple 103 stand perpendicular on one another. Likewise, so do the first, second, and third side surfaces 113, 115, 117 of the second triple. All three side surfaces 105, 107, 109 of the first triple 103 have extensions 119. The extensions 119 project into the side surfaces 115 of adjacent triples 111. There, the extensions 119 form step-type protrusions 121. The extension 119 lies in the same plane as that of the side surface 105 assigned to the extension.

In FIG. 8, a further effect that can occur in the case of curved surfaces can be seen, when the apices of two adjacent triples happen to be situated at the same height. In an overlap region 139, the side surfaces of two adjacent triples can overlap. In other words, the two side surfaces that border on the overlap region 139 lie in a plane and form a common reflection surface.

Figure 9:
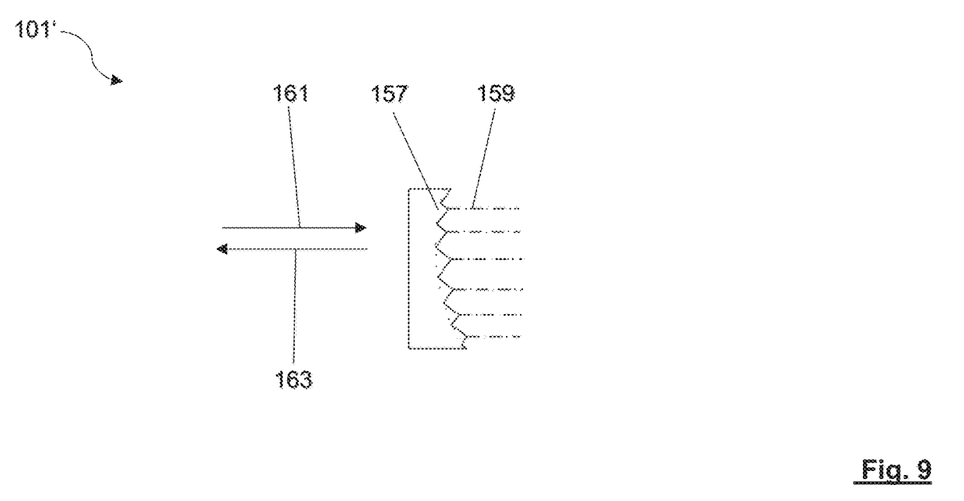
FIG. 9 is a schematic 2D representation of a retroreflector according to the invention.

FIG. 9 shows an exaggeratedly schematic two-dimensional representation of a retroreflector 101' according to the invention on a spherically concave domed surface. The dome 157 is shown with a dotted line. All the axes of symmetry 159 of the triples run parallel to one another in this example. The joints for evening out the dome 157 cannot be seen in the two-dimensional representation. The light path of the incident light 161 and of the reflected light beam 163 are symbolized by arrows.

Figure 10:
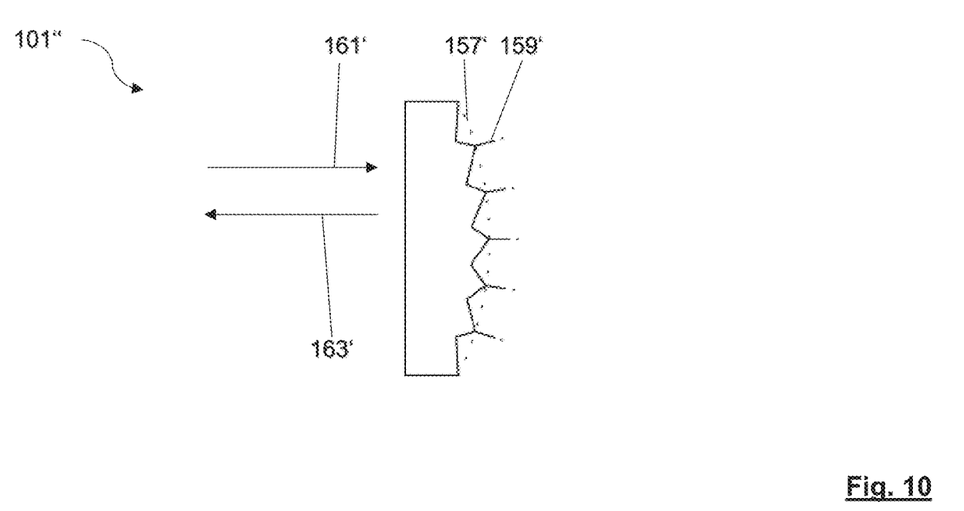
FIG. 10 is a schematic 2D representation of another retroreflector according to the invention.

FIG. 10 shows an exaggeratedly schematic two-dimensional representation of a retroreflector 101" according to the invention on a spherically convex domed surface. All the axes of symmetry 159' of the triples run radially in this example, in other words parallel to a normal line vector of the dome 157'. The joints for evening out the dome 157' cannot be seen in the two-dimensional representation. The light path of the incident light 161' and of the reflected light beam 163' are symbolized by arrows.

Although only a few embodiments of the present invention have been shown and described, it is to be understood that many changes and modifications may be made thereunto without departing from the spirit and scope of the invention.

What is claimed is:
1. A retroreflector comprising:
   (a) a curved or domed surface; and

(b) an arrangement of triples disposed on the curved or domed surface, each triple having first, second, and third side surfaces perpendicular to each other;

wherein the curved or domed surface has a curvature or dome evened out so that the first, second, and third side surfaces of each triple have at least one extension extending along a side surface of an adjacent triple and forming a joint with the side surface of the adjacent triple; and wherein the adjacent triple has a reduced size and a rectangular basic shape.

2. The retroreflector according to claim 1, wherein the joint is a notch that forms an edge of the side surface of the adjacent triple.

3. The retroreflector according to claim 1, wherein the joint is a step-type protrusion that projects out of the side surface (115) of the adjacent triple.

4. The retroreflector according to claim 3, wherein the step-type protrusion is a negative structure of a notch forming an edge of a side surface of an adjacent triple.

5. The retroreflector according to claim 1, wherein at least part of the at least one extension lies in a plane spanned by the respective related side surface.

6. The retroreflector according to claim 5, wherein a width of the at least one extension is smaller by at least a factor of 5 than an edge length of the side surface, wherein a length of the at least one extension amounts to between 50% and 100% of the edge length of the adjacent side surface along which the at least one extension extends.

7. The retroreflector according to claim 6, wherein the at least one extension is disposed in a corner region of the side surface, so that a rectangular basic shape of the surface occurs, wherein the rectangular basic shape is followed by the at least one extension, in a panhandle-type shape.

8. The retroreflector according to claim 1, wherein the first, second, and third side surfaces of a triple lie in planes that intersect in an apex, wherein an axis of symmetry runs through the apex and encloses an identical angle relative to all of the planes, and wherein all the triples have axes of symmetry parallel to a local normal line vector of the curved or domed surface, at least in a region of the retroreflector.

9. The retroreflector according to claim 1, wherein the first, second, and third side surfaces of a triple lie in planes that intersect in an apex, wherein an axis of symmetry runs through the apex and encloses an identical angle relative to all of the side surfaces of the triple, and wherein all the triples have axes of symmetry parallel to one another at least in a region of the retroreflector.

10. A forming die for producing a retroreflector, the forming die comprising;
(a) a curved or domed surface; and
(b) an arrangement of triples disposed on the curved or domed surface, each triple having first, second, and third side surfaces perpendicular to each other;

wherein the curved or domed surface has a curvature or dome evened out so that the first, second, and third side surfaces of each triple have at least one extension along a side surface of an adjacent triple and forming a joint comprising a notch with the side surface of the adjacent triple; and wherein the adjacent triple has a reduced size and a rectangular basic shape.

11. The forming die according to claim 10, wherein at least a part of the at least one extension lies in a plane spanned by the respectively assigned side surface.

12. The forming die according to claim 10, wherein a width of the at least one extension is smaller by at least a factor of 5 than an edge length of the side surface, wherein a length of the at least one extension amounts to between 50% and 100% of the edge length of the side surface of the adjacent triple along which the at least one extension extends.

13. The forming die according to claim 12, wherein the at least one extension is disposed in a corner region of the side surface, so that a rectangular basic shape of the side surface occurs, and wherein the at least one extension follows the rectangular basic shape with a panhandle-type shape.

14. The forming die according to claim 10, wherein the first, second, and third side surfaces of a triple lie in planes that intersect in an apex, wherein an axis of symmetry runs through the apex and encloses an identical angle relative to all of the planes, and wherein all the triples have axes of symmetry parallel to a local normal line vector of the curved or domed surface, at least in a region of the retroreflector.

15. The forming die according to claim 10, wherein the first, second, and third side surfaces of a triple lie in planes that intersect in an apex, wherein an axis of symmetry runs through the apex and encloses the same angle relative to all of the side surfaces of the triple, and wherein all the triples are have axes of symmetry parallel to one another at least in a region of the retroreflector.

16. A retroreflector produced using the forming die according to claim 10.

17. A first forming die produced by galvanic molding using a second forming die, wherein the second forming die comprises the forming die according to claim 10.

18. A method for producing the forming die according to claim 10, the method comprising:
(a) providing solid material in an original form; and
(b) individually working each triple by micro-cutting out of the solid material;
wherein a diamond needle on a multi-axial machine is used as a cutting tool;
wherein the original form comprises aluminum, copper, gold, lead, a nickel-copper-zinc alloy or nickel phosphorus; and
wherein during cutting joints comprising notches and extensions of side surfaces based on a curved or domed surface occur.

* * * * *